United States Patent [19]
Akerman et al.

[11] Patent Number: 5,539,705
[45] Date of Patent: Jul. 23, 1996

[54] ULTRASONIC SPEECH TRANSLATOR AND COMMUNICATIONS SYSTEM

[75] Inventors: M. Alfred Akerman, Knoxville; Curtis W. Ayers, Clinton; Howard D. Haynes, Knoxville, all of Tenn.

[73] Assignee: Martin Marietta Energy Systems, Inc., Oak Ridge, Tenn.

[21] Appl. No.: 329,889

[22] Filed: Oct. 27, 1994

[51] Int. Cl.$^6$ ........................................ H04B 11/00
[52] U.S. Cl. ............................................... 367/132
[58] Field of Search ................................ 367/132, 131, 367/133, 134, 7

[56] References Cited

U.S. PATENT DOCUMENTS

| | | | |
|---|---|---|---|
| 3,662,371 | 5/1972 | Lee et al. | 367/93 |
| 3,688,029 | 8/1972 | Bartoe Jr. et al. | 367/7 |
| 3,790,891 | 2/1974 | Bjelvert | 367/132 |
| 3,828,336 | 8/1974 | Massa | 367/94 |
| 3,867,715 | 2/1975 | Geil | 367/132 |
| 3,942,176 | 3/1976 | Bright | 367/191 |
| 3,967,260 | 6/1976 | Massa | 367/901 |
| 3,980,954 | 9/1976 | Whyte | 455/45 |
| 4,039,999 | 8/1977 | Weston | 367/132 |
| 4,068,093 | 1/1978 | Fidi | 367/128 |
| 4,206,449 | 6/1980 | Galvin et al. | 340/505 |
| 4,236,665 | 4/1981 | Watts | 367/94 |
| 4,310,854 | 1/1982 | Baer | 358/143 |
| 4,319,349 | 3/1982 | Hackett | 367/94 |
| 4,367,458 | 1/1983 | Hackett | 340/539 |
| 4,432,079 | 2/1984 | Mackelburg et al. | 367/132 |
| 4,711,152 | 12/1987 | Fortunko | 89/6.5 |
| 4,821,326 | 4/1989 | MacLeod | 381/51 |
| 5,136,555 | 8/1992 | Gardos | 367/132 |
| 5,159,703 | 10/1992 | Lowery | 455/42 |

*Primary Examiner*—Daniel T. Pihulic
*Attorney, Agent, or Firm*—J. S. Spicer; A. S. Neely; H. W. Adams

[57] ABSTRACT

A wireless communication system undetectable by radio frequency methods for converting audio signals, including human voice, to electronic signals in the ultrasonic frequency range, transmitting the ultrasonic signal by way of acoustical pressure waves across a carrier medium, including gases, liquids, or solids, and reconverting the ultrasonic acoustical pressure waves back to the original audio signal. The ultrasonic speech translator and communication system (20) includes an ultrasonic transmitting device (100) and an ultrasonic receiving device (200). The ultrasonic transmitting device (100) accepts as input (115) an audio signal such as human voice input from a microphone (114) or tape deck. The ultrasonic transmitting device (100) frequency modulates an ultrasonic carrier signal with the audio signal producing a frequency modulated ultrasonic carrier signal, which is transmitted via acoustical pressure waves across a carrier medium such as gases, liquids or solids. The ultrasonic receiving device (200) converts the frequency modulated ultrasonic acoustical pressure waves to a frequency modulated electronic signal, demodulates the audio signal from the ultrasonic carrier signal, and conditions the demodulated audio signal to reproduce the original audio signal at its output (250).

32 Claims, 6 Drawing Sheets

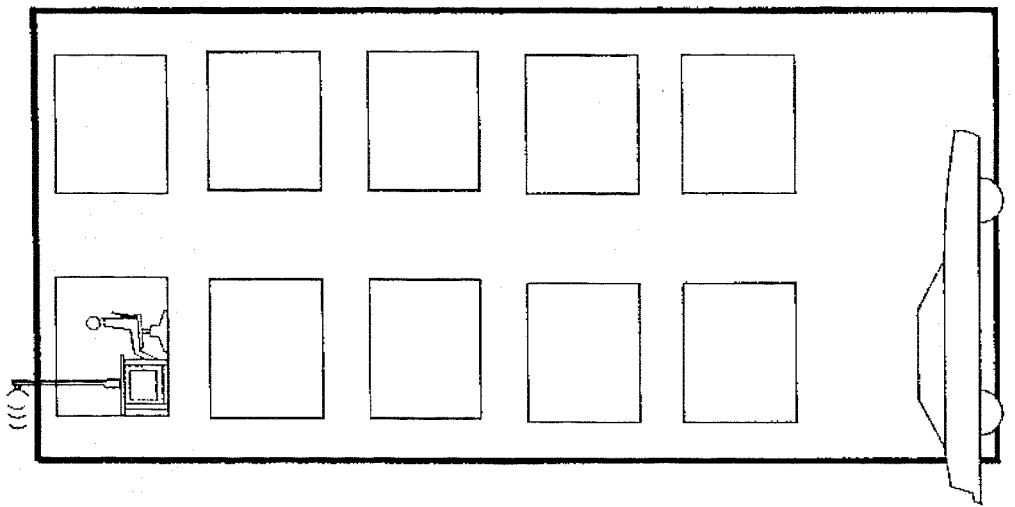
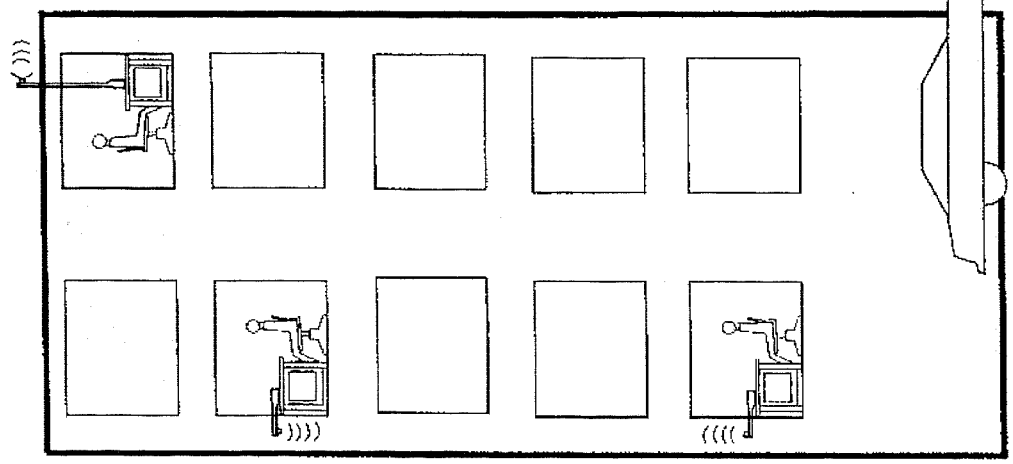
Fig. 4

ULTRASONIC SPEECH TRANSLATOR AND COMMUNICATIONS SYSTEM

This invention was made with Government support under Contract DE-AC05-840R21400 awarded by the U.S. Department of Energy to Martin Marietta Energy Systems Inc., the Government has certain rights to this invention.

BACKGROUND OF THE INVENTION

The present invention relates generally to the art of wireless communication and, more particularly, to a system which utilizes ultrasonic acoustical pressure waves to transmit and receive audio signals across a medium such as gas, liquid, or solid material. The invention further relates to the art of modulation of audio signals to the ultrasonic frequency range, and to the art of demodulation of audio signals from frequency modulated ultrasonic carrier signals. The invention further relates to the art of inaudible communication, whereby the information contained in the signals is secure and undetectable by radio frequency monitoring.

Radio frequency waves, or electromagnetic radiation in the frequency range of approximately 10 kilohertz to 100 gigahertz, has been utilized for wireless communication systems by civilian and military personnel for decades. Numerous applications of radio frequency communication methods include, to name a few, radio broadcasting, air traffic control, and cellular telecommunications. Radio frequency communication is limited, for practical purposes, to operation within mediums such as air and space. Furthermore, radio frequency methods are inappropriate in some circumstances where communication is required, such as within blasting zones where explosives may be susceptible to unplanned detonation due to radio interference. In addition, radio frequency methods are limited in their ability to provide a secure system to ensure confidentiality of information, which is required by many applications for communication.

Sound waves, or acoustical pressure waves, have likewise been successfully employed as a method of wireless ultrasonic communication across various mediums. Ultrasonic communication is most often utilized in underwater applications because the physical properties of solids and liquids tend to allow waves traveling via molecular vibrations to cover relatively long distances, on the order of the kilometer range. It has been similarly employed for communication over structural matter such as beams or pipes. Ultrasonic communication has generally not been utilized in air for long range communication because radio frequency methods are particularly suitable in air for long range communication, offering suitable and efficient means for most applications.

Some applications, however, require security and inaudibility by radio detectors. Examples of these applications include undercover operations where it is necessary not only that the communication be uninterpretable, but also that the communication be undetectable so as not to alert the presence of such communication. Other applications requiring inaudibility include situations where radio frequency methods are inappropriate, such as, for example, in a blasting zone where the presence of radio frequency waves could unexpectedly set off a detonator or in a factory with sensitive electronics or other components sensitive to electromagnetic radiations.

In applications requiring confidentiality and a high degree of security, numerous schemes have been employed to minimize detection and eavesdropping. These schemes often include scrambling a signal prior to broadcasting and then unscrambling the signal after reception, as well as continual switching from frequency to frequency. The main problem with these existing techniques is that the simple detection of any radio frequency transmission whatsoever, even if the transmitted signals are not decoded or interpreted, indicates the presence of existing communication. Thus, such schemes may not provide sufficient security in operations requiring complete inaudibility. It is desirable, therefore, to provide a communication system which is inaudible by radio frequency detectors.

The invention is disclosed herein in the context of utilizing ultrasonic waves for relatively long range, secure, wireless communication through air. However, by way of example, and not limitation, the disclosed invention is useful in a variety of applications including undercover operations, industrial applications, and many commercial uses in various media.

Prior art ultrasonic communication systems involving the conversion of audio signals to ultrasonic acoustical pressure waves encompass a variety of methods and applications. In the context of the present invention, it may be noted that there are no known prior art communication systems which employ ultrasonic acoustical pressure waves for signal transmission through air for relatively long distances.

Prior art ultrasonic communication systems employ a means of carrying a modulated ultrasonic frequency signal from a transmitter to a receiver. One approach has been disclosed for use in electrical power networks, whereby a two-tone control signal frequency modulates an ultrasonic subcarrier which is then used to frequency modulate the broadcast of a local FM station. The frequency modulated ultrasonic signal is demodulated from the FM broadcast program on the receiving end by receiver circuitry. In this particular approach, however, communication is entirely through radio frequency waves and telephone lines, whereby although a signal is used to modulate an ultrasonic subcarrier, the modulated ultrasonic subcarrier is never transformed from radio frequency signals to acoustical pressure waves. The communication thus remains detectable by radio frequency detectors. It is desirable to employ an alternate communication carrier other than radio frequency waves such that the system is not limited to the use of radio facilities or wire lines.

Another prior art approach for transmitting a modulated ultrasonic frequency signal across a medium is through the conversion of the electronic audio signals to acoustical pressure waves. This technique is employed in many communication systems where radio waves cannot travel useful distances due to the attenuation caused by the properties of the carrier medium, as in underwater communication.

Prior art ultrasonic communication systems employ a means of modulating an ultrasonic frequency signal with an audio frequency signal. Methods utilized have included both amplitude modulation and angle modulation, which encompasses both frequency and phase modulation.

The amplitude modulation techniques used in prior art have encountered the inherent limitation that medium disturbance, e.g. air or water currents, causes additional amplitude modulation of a carrier signal. Thus, unwanted signals from medium disturbance become superimposed on the amplitude modulated carrier, which often results in difficulty recovering a clean original audio signal. Furthermore, amplitude modulation, even when superimposed on a carrier of ultrasonic frequency, may still be audible.

Another prior art approach for modulating an ultrasonic frequency signal with an audio signal is through frequency modulation. One prior art technique feeds an audio signal through a modulator to produce a frequency modulated (FM) radio frequency signal at a predetermined intermediate center frequency. The FM radio frequency signal is then fed into one input of a balanced modulator having a second input of fixed frequency from a local oscillator. The balanced modulator produces two outputs including the sum and the difference of the two input signals, whereby proper selection of the fixed intermediate frequency for the first input and the fixed frequency for the second input produces at the difference output the frequency modulated signal in the ultrasonic range. It would be desirable to eliminate the additional intermediate carrier frequency step.

Prior art techniques for demodulating audio signals from frequency modulated ultrasonic carrier signals in ultrasonic communication systems have utilized digital integrated circuit techniques.

The present invention reveals a technique for inaudible, long range communication through air, as well as other media such as water or solid pipes and beams. Prior art techniques have involved limitation to liquid or solid media or to very short ranges in air.

The present invention also reveals a technique for simple, direct modulation of audio signals onto ultrasonic frequency carrier signals for use in ultrasonic communication systems. Prior art techniques have always involved indirect techniques resulting from the high cost of quality components required to build systems with high noise immunity operating at high frequency with a wide bandwidth.

Similarly, the present invention reveals a technique for simple, direct demodulation of audio signals from ultrasonic frequency carrier signals for use in ultrasonic communication systems. Again, prior art techniques have involved more complicated, indirect techniques for demodulation.

SUMMARY OF THE INVENTION

Accordingly, it is an object of the invention to provide a transmitting device capable of converting audio signals to frequency modulated ultrasonic acoustical pressure waves using a simple, direct method of frequency modulation.

It is another object of the invention to provide a receiving device capable of converting frequency modulated ultrasonic acoustical pressure waves into audio signals using a simple, direct method of signal demodulation.

It is yet another object of the invention to provide a wireless communication system which may be employed where radio frequency is prohibited.

It is yet another object of the invention to provide a secure communication system to protect confidential information against eavesdropping.

It is yet another object of the invention to provide a system for communicating in a noisy environment.

It is yet another object of the invention to provide a portable convenient method of wireless communication.

Briefly, in accordance with one aspect of the invention, there is provided an ultrasonic transmitting device which includes an input device such as a microphone which converts audio acoustical pressure waves to electronic audio signals, or an audio input for accepting electronic audio signals such as from a tape deck. A pre-amplifier raises the audio signal to an acceptable power level without significant degradation in the signal-to-noise ratio. The amplified audio signal produced by the pre-amplifier feeds into the input of a voltage controlled oscillator, having a fixed carrier frequency set in the ultrasonic range and producing at its output an ultrasonic carrier signal which is frequency modulated by the audio signal. A power amplifier amplifies the frequency modulated carrier signal to a sufficient power level to produce an amplified frequency modulated Carrier signal. The amplified frequency modulated carrier signal drives an electroacoustic transducer, which converts the amplified frequency modulated carrier signal to frequency modulated acoustical pressure waves for transmission across a carrier medium, such as air, water, or pipes and beams. Preferably, the transducer is designed to unique size and performance specifications such that it contains linear characteristics in the desired ultrasonic frequency range, as well as sufficient power for the desired application.

In accordance with another aspect of the invention, there is provided an ultrasonic receiving device which includes an electroacoustic transducer to convert the frequency modulated acoustical pressure waves to a frequency modulated electronic carrier signal. Preferably, the linear frequency and power characteristics of the receiving transducer match the characteristics of the transmitting transducer. A signal conditioner receives the frequency modulated electronic carrier signal for conditioning to produce a conditioned frequency modulated carrier signal. Preferably this includes an amplifier which receives the frequency modulated electronic carrier signal and amplifies it to produce an amplified frequency modulated carrier signal of a suitable level for filtering without degradation of the signal-to-noise ratio. The amplified frequency modulated carrier signal may contain amplitude modulated noise due to natural carrier medium disturbance such as wind in air or currents in water. Preferably, a bandpass filter removes the unwanted ambient acoustic noise from the amplified frequency modulated carrier signal to produce a filtered frequency modulated carrier signal. Preferably, a main signal amplifier device receives the filtered frequency modulated carrier signal, amplifying it in preparation for demodulation, to produce a conditioned frequency modulated carrier signal. A phase-locked loop demodulator performs the actual direct demodulation of the audio signal from the ultrasonic carrier signal. Complicated phase-locked loop techniques were impractical or uneconomical in the past. However, in accordance with one aspect of the invention, a direct method of demodulation is used, whereby the input of the phase-locked loop is a conditioned frequency modulated carrier signal, and the output is the recovered audio signal. An audio signal conditioner device, preferably including a low-pass filter, removes unwanted noise from the receiver electronics to produce a conditioned audio signal. A power amplifier amplifies the conditioned audio signal to the appropriate level to drive the desired output device such as a speaker or headphone set.

The ultrasonic speech translator and communication system provides an elegant solution for secure, long-range, inaudible, and wireless communication through air and various other mediums. The invention may be applicable in a wide variety of applications.

As one example of an application for the ultrasonic speech translator and communication system, directional receivers in the form of a small button may be mounted on a hat which feeds to earphones, whereby the user can detect which direction the signal is coming from as well as what the person is saying.

As another example, the reception and transmission could be in a plane just above the ground.

As yet another example, multiple sets may be utilized, where each user transmits at a different frequency and receives one or more frequencies at a time.

As another example, communication may occur throughout a rigid structure by connecting the transmitter and receiver to it, said rigid structures including, but not limited to, piping, concreted beams or floors, and building steel, as in a house or building or the space station or shuttle.

As another example, in communicating data signals rather than voice signals, the system may operate as a wireless computer network within a building.

As another example, the ultrasonic speech translator and communication system may be very portable, taking the form of quick temporary hookups at numerous suitable locations in an office building, industrial facility, and others. This concept may be applied to areas such as space shuttle or space station internal communication through the vessel structural members.

As yet a further example, the invention may be employed in circumstances where radio interference is prohibited but close communication is necessary, such as in a blasting site containing explosive detonators.

As another example, in areas where high audible noise levels are present, this system may operate as a wireless voice communicator between personnel working in the area.

As another example, the invention may provide secure and discrete communication for military, security, and law enforcement applications. Applications of this technique include communication through air when radio frequencies are monitored and communication must be secure and undetected.

As another example, this communication scheme may be miniaturized and integrated for use in binoculars or rifles or concealed in clothing. An inexpensive toy based on this ultrasonic communication technique may be designed and mass marketed as a non-radio based walkie-talkie, allowing discrete communication through air, water pipes, or solid walls, without detection by radio frequency scanners.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description of a preferred embodiment, taken in conjunction with the drawings, in which:

FIG. 4 depicts example uses for the ultrasonic speech translator and communication system.

DETAILED DESCRIPTION

Figure 1:
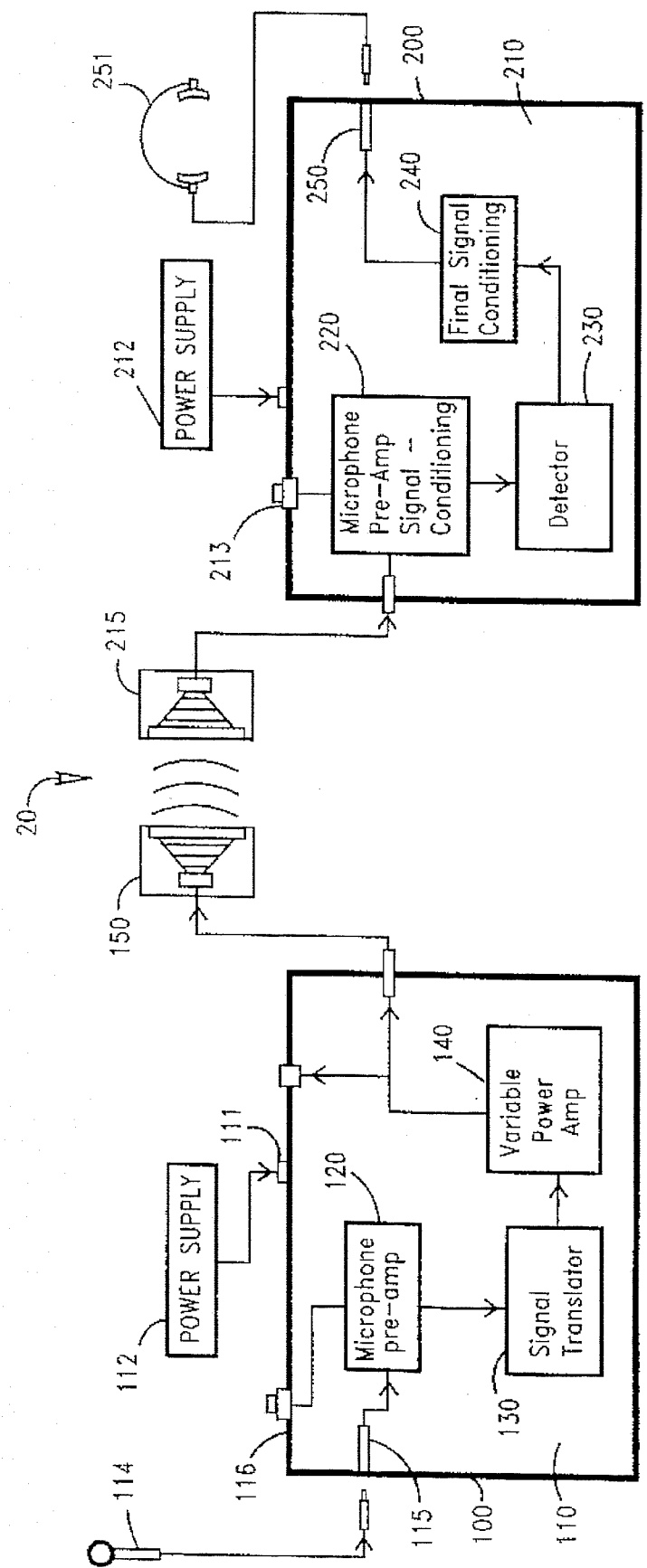
FIG. 1 depicts a block diagram of the ultrasonic speech translator and communication system in accordance with the invention.

Turning now to the drawings in greater detail, there is illustrated in FIG. 1 an ultrasonic speech translator and communication system 20 embodying the invention. The embodiment herein described is particularly well-suited for focused directional communication through air for distances of approximately 100 to 150 feet. However, it will be understood that the ultrasonic communication system 20 may be utilized in other carrier media as well as in applications in air with broader directional requirements such as for transmitting throughout a closed room among several people with receiving devices 200. Accordingly, the principles of the present invention may be variously applied.

FIG. 1 is a block diagram of the ultrasonic speech translator and communication system 20 comprising an ultrasonic transmitting unit 100 and an ultrasonic receiving unit 200.

Figure 2:
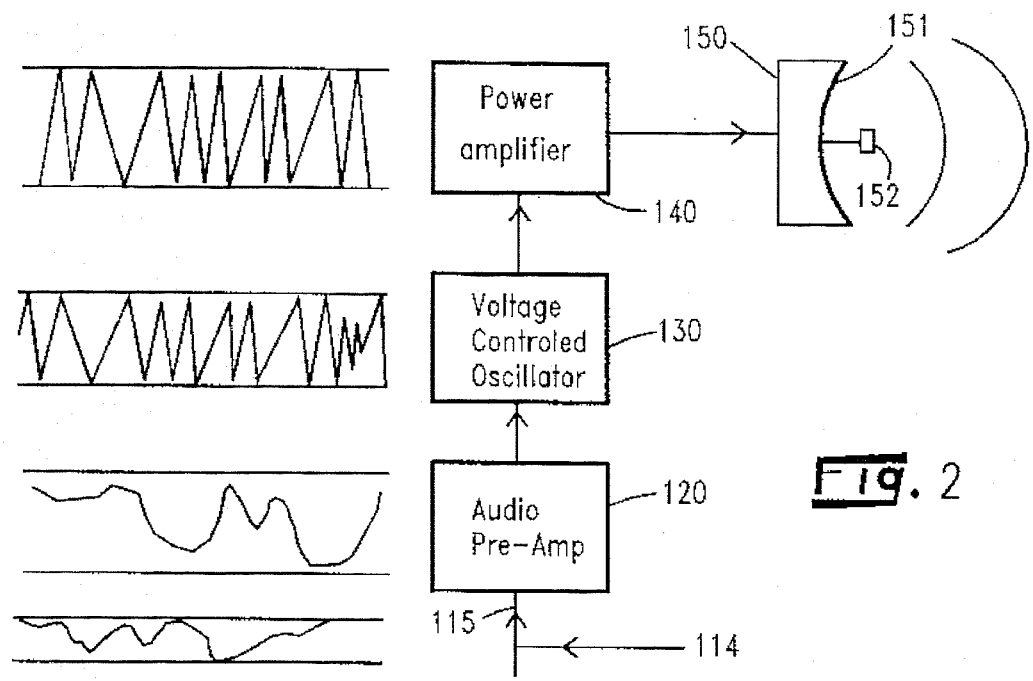
FIG. 2 depicts a block diagram of the ultrasonic transmitting device along with the corresponding output signal waveforms for each device.
Figure 5:
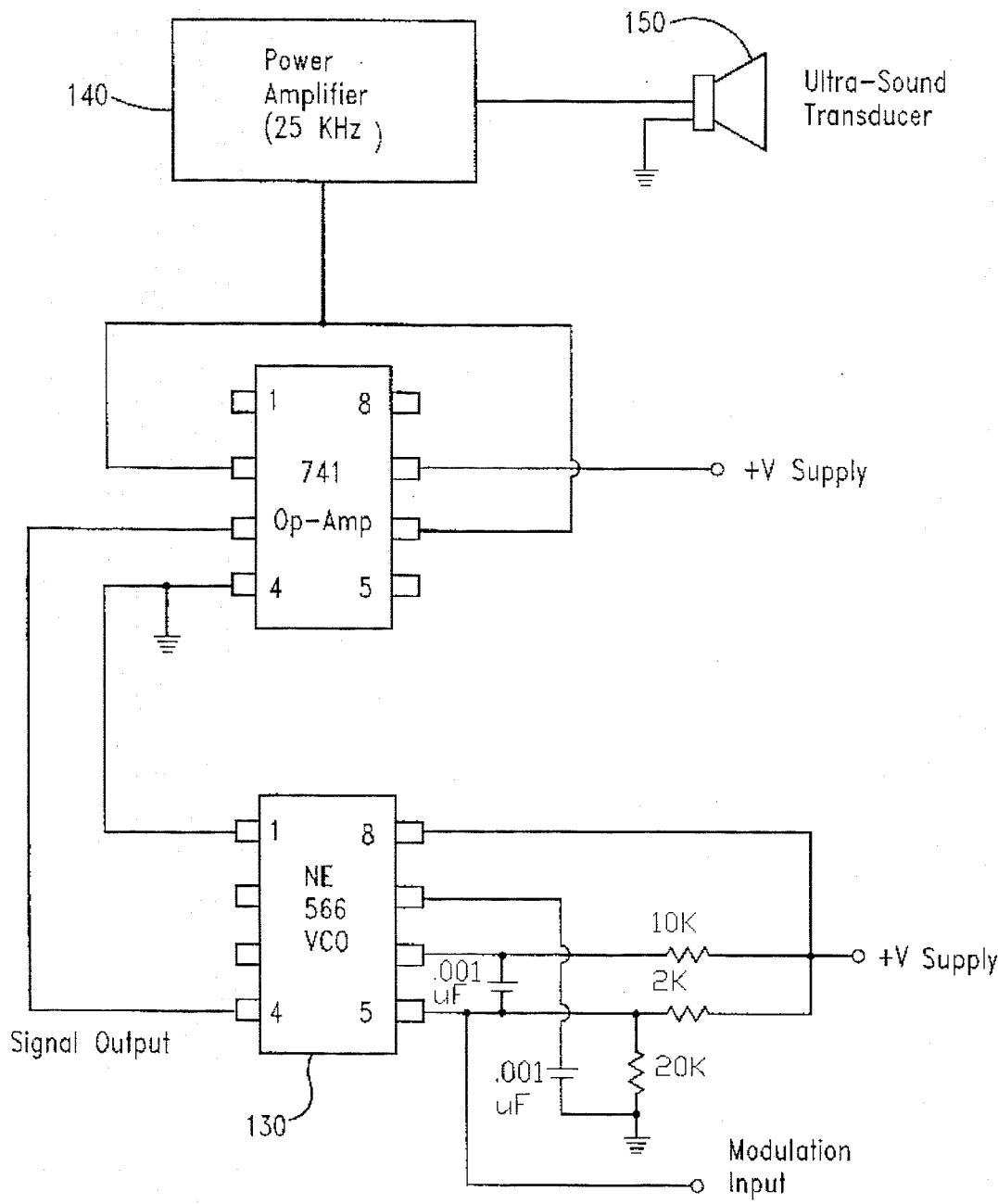
FIG. 5 depicts a the circuit diagram for the specific embodiment of the ultrasonic transmitting device herein described.

With references to FIG. 1, FIG. 2, and FIG. 5, the ultrasonic transmitting unit may be constructed in any suitable form or in any container 110, with provisions for acceptable power input 111 provided by a source of power including but not limited to a power supply or battery pack 112. The ultrasonic transmitting device described in this specific embodiment utilizes a metal chassis the approximate volume of a cigarette pack.

Included in the ultrasonic transmitting device 100 is an input device 115 capable of receiving electronic audio signals in the range 20 hertz to 20 kilohertz. The audio signals may be derived from an external device such as a tape deck or a microphone 114 which converts sound such as voice to electronic audio signals. Alternatively, a device for converting sound to electronic audio signals such as a microphone 114 may be built into the system.

Also included in the ultrasonic transmitting device is a pre-amplification device 120 which preferably includes a variable gain microphone control switch 116. The pre-amplification device 120 may be constructed using any suitable operational amplifier designed for the desired output gain. In the specific embodiment, said pre-amplifier consists of a 741-type operational amplifier with a variable input gain of approximately 100.

The actual modulation of the ultrasonic carrier by the audio signal is performed by a voltage controlled oscillator 130. Any suitable voltage controlled oscillator which operates in the ultrasonic range may be utilized to perform the modulation. Suggested voltage controlled oscillators include model number 566 or equivalents, as well as any suitable newer voltage controlled oscillators. The specific embodiment utilizes a NE 566 voltage controlled oscillator integrated circuit with the ultrasonic carrier frequency set at approximately 21.8 kilohertz, but it may be set at any desired ultrasonic carrier frequency that the specific voltage controlled oscillator 130 is capable of producing. Thus, the practical ultrasonic carrier frequency ranges from 20 kilohertz to 100 kilohertz in air, and 20 kilohertz to 1000 kilohertz in liquids and solids. In the specific embodiment, the 21.8 kilohertz carrier signal is frequency modulated by the amplified audio input signal from the audio input 115, and appears at the output of the voltage controlled oscillator 130.

The output of the voltage controlled oscillator 130 is connected directly to the input of the power amplifier 140. The power rating of the power amplifier 140 is application specific, depending on the load rating of the electroacoustic transducer 150 and the desired output power in watts.

Figure 7:
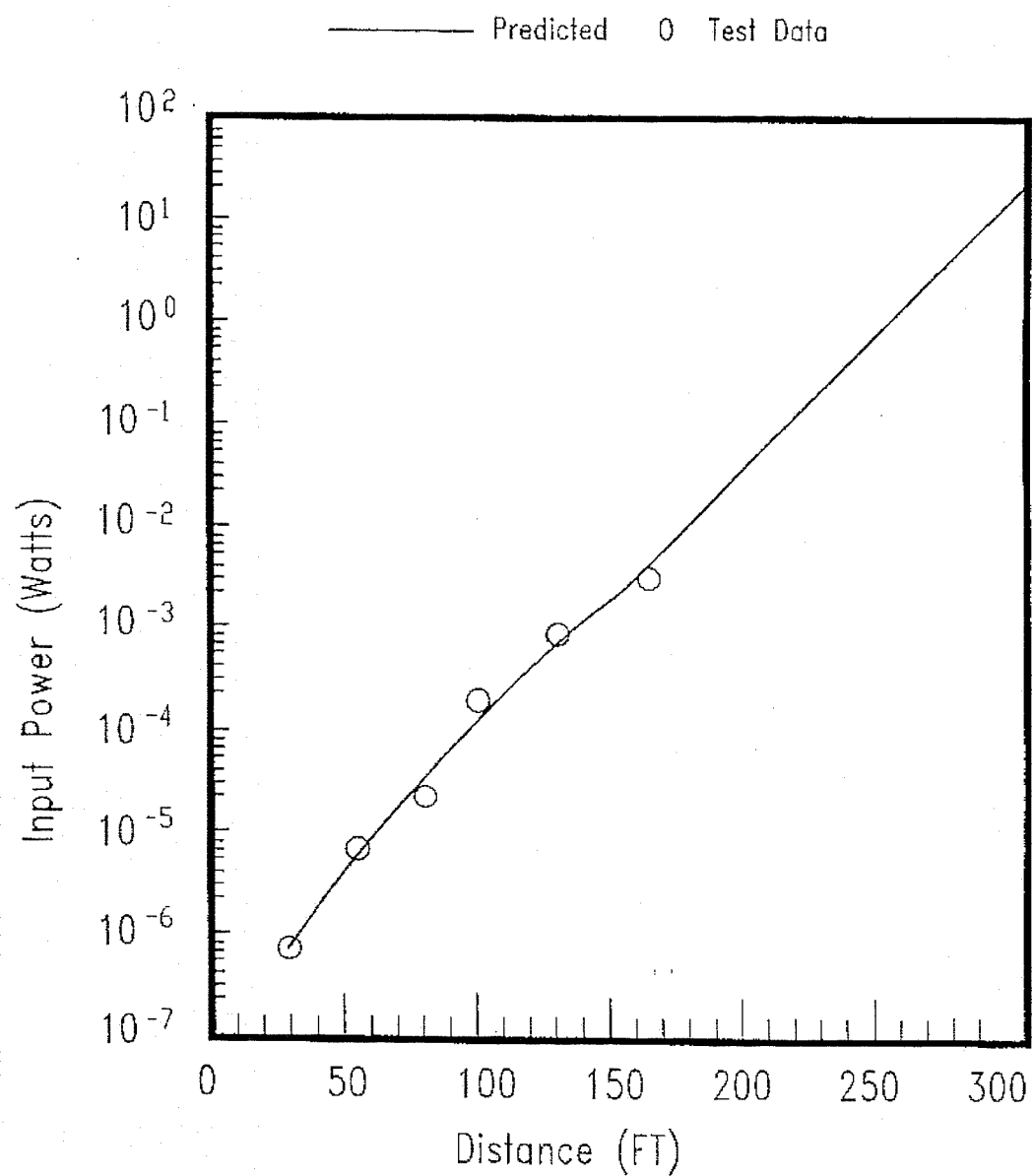
FIG. 7 depicts a graph of transmitted power level versus distance actually achieved by the specific embodiment herein described.

The output of the power amplifier 140 drives the electroacoustic transducer 150 to transmit the frequency modulated ultrasonic carrier signal across the carrier medium via acoustical pressure waves. Through a careful selection of transmitter and receiver subcomponents, voice and music have been transmitted over 100 feet in air using less than 1 mW of electrical power. FIG. 7 illustrates the distances actually achieved using the specific embodiment, along with predicted distances with more applied power. Subcomponents in the specific embodiment include signal translation and detection circuits based on frequency-modulation (FM) where carrier is 21.8 kHz, efficient electroacoustic transducers 152, specially-designed parabolic dish reflectors 151, parabolic dish collectors 216, and sensitive microphone element 217. Analytical models predict a useful range of 250 ft can be achieved with less than 5 watts input power. The application for the specific embodiment was to achieve distance with small output power. The transducer chosen was of piezoelectric material with a linear response in the range of 21.8 kilohertz, modified by increasing the gain in the linear response band, and narrowing the parabolic dish elements 216, 151 for a more focused directional sensitivity. Additional engineering may be carried out to optimize the transducer, collector, and frequency combination for specific applications having unique requirements. For example, higher power with an optimized collector dish may be employed to achieve extended distance; miniaturization of transmitter and receiver devices may be accomplished for concealment in clothes, or for integration in other equipment such as binoculars or rifles. Each application may utilize transducers specially-designed to unique size and performance specifications. The transducers may be made of any suitable material including, by way of example and not limitation, piezoelectric material. The output of the transducer 150 is the frequency modulated ultrasonic carrier signal converted to acoustical pressure waves which travel across the medium.

Figure 3:
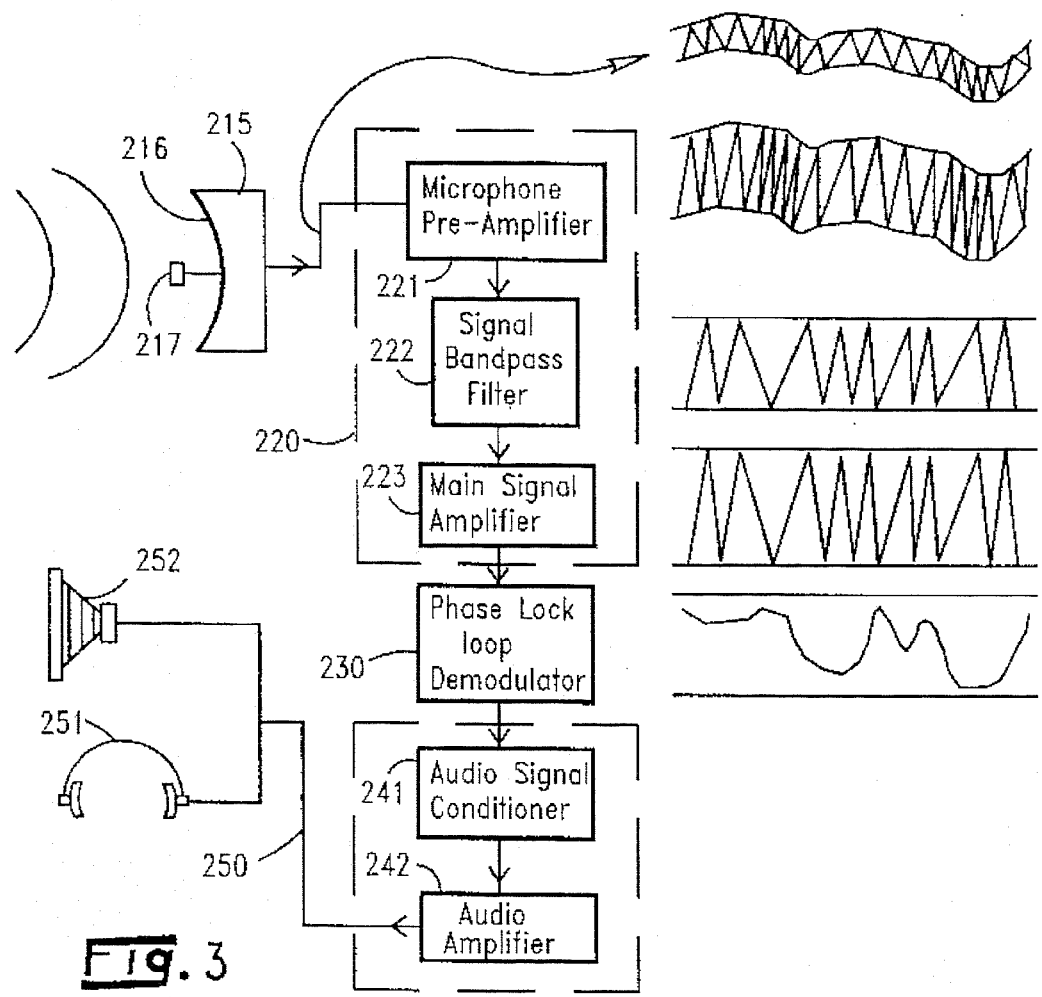
FIG. 3 depicts a block diagram of the ultrasonic receiving device along with the corresponding output signal waveforms for each device.
Figure 6:
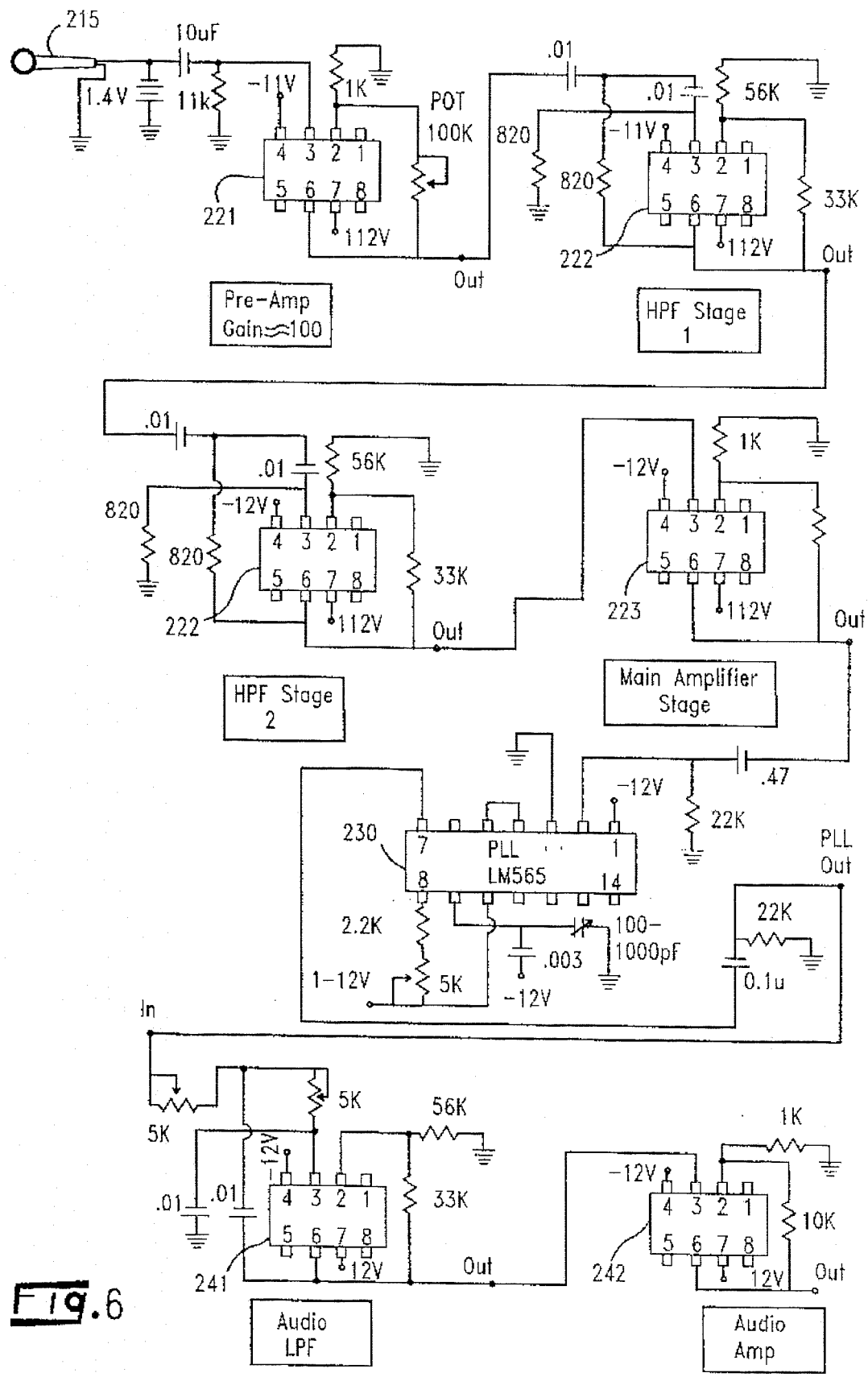
FIG. 6 depicts a the circuit diagram for the specific embodiment of the ultrasonic receiving device herein described.

With references to FIG. 1, FIG. 3, and FIG. 6, the ultrasonic receiving device 200 may be constructed in any suitable form or in any container 210, with provisions for acceptable power input 211 provided by a source of power including but not limited to a power supply or battery pack 212. The ultrasonic receiving device described in this specific embodiment utilizes a metal chassis.

The ultrasonic receiving device 200 includes an receiving transducer 215, which receives the frequency modulated acoustical pressure waves transmitted across the carrier medium. In the preferred embodiment, the linear frequency and power characteristics match that of the electroacoustic transducer 150 of the ultrasonic transmitting unit 100. In the specific embodiment, the receiving transducer 215 matched the transmitting transducer 150 with its linear frequency range near 21.8 kilohertz and its specially-designed narrow parabolic collector dish 216 and sensitive microphone element 217. The frequency modulated acoustical pressure waves are converted by the receiving transducer 215 to a frequency modulated electronic carrier signal.

The frequency modulated electronic carrier signal from the receiving transducer 215 feeds directly into a signal conditioner 220 depicted in FIG. 1. The frequency modulated electronic carrier signal at this stage may contain unwanted amplitude modulation generated by disturbance in the carrier medium, and it may contain added ambient noise. Disturbance may be caused by natural air currents, water currents, or unrelated vibration in solids. Preferably, the signal conditioner 220 includes a pre-amplifier 221, a band-pass filter 222, and a main signal amplifier 223.

In the preferred embodiment, the frequency modulated carrier signal from the receiving transducer 215 connects directly to the pre-amplifier 221, which increases the power without changing the signal-to-noise ratio in preparation for filtering the unwanted noise caused by carrier medium disturbance. The preferred embodiment utilizes a variable-gain operational amplifier, preferably with means of adjusting the gain via a gain control knob 213. In the specific embodiment, the preamplifier 221 utilized a 741-type operational amplifier with a variable gain of approximately 100.

The output of the pre-amplifier 221 ideally electrically connects directly to a band-pass filter 222, which actually removes the unwanted noise. Alternatively, a high-pass filter with a cutoff frequency passing only ultrasonic frequency signals may be used. The specific embodiment actually utilizes a high-pass filter built from 741-type operational amplifiers designed with a cutoff frequency of approximately 20 kilohertz. The output of the filter 222 contains the filtered frequency modulated ultrasonic carrier signal having the desired frequency bandwidth. Amplitude modulations will still be present in the signal at this stage.

The output from the band-pass filter 222 electrically connects directly into the main signal amplifier 223 for pre-demodulation conditioning. The specific embodiment utilizes a 741-type operational amplifier with a gain of 100, producing the conditioned frequency modulated carrier signal at its output.

Demodulation of the audio signal from the ultrasonic carrier signal is performed via a phase-locked loop. The phase-locked loop, an electronic servo system, attempts to maintain a fixed phase relationship with the input signal. Typically, a phase-locked loop contains a phase detector, a low-pass filter, and a voltage controlled oscillator. The phase detector compares the frequency of an input signal with the frequency of the voltage controlled oscillator. The voltage output from the phase detector is the measure of their phase difference, called the phase error signal. The phase error signal feeds into a low-pass filter and is amplified to adjust the control voltage of the voltage controlled oscillator, which feeds into the second input of the phase detector. In this manner, the voltage controlled oscillator attempts to "lock" to the input carrier frequency signal. It will be noted that the output of the low-pass filter is the desired demodulated audio signal. Phase locked loops built with discrete components are complex to build and fairly unreliable. Phase-locked loops built as integrated circuits are easy to use due to small packaging, have high immunity to amplitude modulations, and are reliable when utilized properly in a design. Typical general purpose phase-locked loops available from many manufacturers provide two outputs. One output is a square wave oscillator output, which is equal to the incoming carrier frequency when the signals are locked. The other output is a voltage proportional to the frequency of the incoming signal. This is the modulating signal output of the demodulator, which, in this application, is the desired recovered original audio signal. The preferred embodiment of the ultrasonic receiving device 200 utilizes any integrated circuit phase-locked loop which accepts at its input a carrier signal in the anticipated ultrasonic range, and produces the output of the low-pass filter at one of its outputs.

The phase-locked loop 230 receives the frequency modulated ultrasonic carrier signal from the main signal amplifier 223. The specific embodiment utilizes a Signetics LM 565 phase-locked loop 230, and locks on to the carrier signal frequency of 21.8 kilohertz. The phase-locked loop 230 low-pass filter output is the demodulated audio signal.

The output of the phase-locked loop 230 electrically connects directly to the input of the final signal conditioning unit 240. Included in the final signal conditioning unit 240 is a filter 241 which filters out unwanted receiver noise, and an audio amplifier 242 which amplifies the final audio signal to a suitable power level to drive the output device.

The filter 241 receives the demodulated audio signal from the phase-locked loop demodulator 230. In the preferred embodiment, the unwanted electronics circuitry noise is filtered using a low-pass filter. The specific embodiment implements a low-pass filter employing a 741-type operational amplifier. The output of the filter 241 contains a reproduction of the original audio input signal. This output is fed directly into the audio amplifier 242 which increases the power of the audio signal while maintaining the signal-to-noise ratio. The specific embodiment utilizes a 741-type operational buffer amplifier circuit with a gain of 10, feeding to the output 250, which drives a set of headphones 251 or a powered speaker 252.

Considering now exemplary uses by which the ultrasonic speech translator and communication system 20 may be employed, FIG. 4 illustrates several applications. These include by way of example and not limitation communication between two people, between two cars, between a person and a car, between two buildings, between a car and a building, between a person and a building, and between locations within the same building. Furthermore, the system may be designed for use with various carrier media, including air, liquids, and solids.

From the foregoing description of the invention, it will be appreciated that the ultrasonic speech translator and communication system encompasses a wide range of desirable and useful applications. While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A wireless communication system for transmitting and receiving audio signals via ultrasonic acoustical pressure waves comprising an ultrasonic transmitting device and an ultrasonic receiving device;

wherein the ultrasonic transmitting device further comprises:
  a source for producing audio signals;
  a voltage controlled oscillator for receiving the audio signal, producing a carrier signal in the ultrasonic frequency range, frequency modulating the carrier signal with the audio signals, and producing a frequency modulated carrier signal;
  a transmitting converter for receiving a frequency modulated carrier signal and transforming the frequency modulated carrier signal to produce a frequency modulated acoustic pressure wave signal; and wherein the ultrasonic receiving device further comprises:
  a receiving converter for receiving frequency modulated acoustic pressure wave signals and transforming the frequency modulated acoustic pressure wave signals to produce a frequency modulated electronic carrier signal;
  a demodulator for receiving a frequency modulated electronic carrier signal, demodulating the modulating audio signal from the ultrasonic carrier signal, and producing a demodulated audio signal; and
  an output device for receiving the demodulated audio signal.

2. A wireless communication system in accordance with claim 1, wherein the ultrasonic receiving device further comprises a signal conditioner for receiving a frequency modulated electronic carrier signal, conditioning the frequency modulated electronic carrier signal for frequency demodulation, and producing a conditioned frequency modulated carrier signal that is received by the demodulator.

3. A wireless communication system in accordance with claim 1, wherein the ultrasonic receiving device further comprises a filter for receiving a demodulated audio signal, removing unwanted electronic noise and producing a filtered audio signal that is received by the output device.

4. A wireless communication system in accordance with claim 1, wherein the ultrasonic receiving device further comprises an audio amplifier for receiving a demodulated audio signal and amplifying the demodulated audio signal to produce a final audio signal that is received by the output device.

5. A wireless communication system in accordance with claim 1, wherein the demodulator for receiving a conditioned modulated carrier signal on the ultrasonic receiving device comprises an integrated circuit phase-locked loop further comprising:

a phase detector for receiving the conditioned frequency modulated carrier signal and a control signal, and for comparing the frequency of the conditioned frequency modulated carrier signal with the frequency of the control signal to produce a phase error signal, such that the phase error signal is the frequency difference between the two input signals;

a low-pass filter for receiving said phase error signal and filtering out the high frequency noise components to produce a filtered phase error signal;

an amplifier for receiving the filtered phase error signal and amplifying it to produce both the demodulated audio signal output of the demodulator and a feedback control voltage; and a voltage controlled oscillator for receiving the feedback control voltage, adjusting the frequency of the voltage controlled oscillator in the direction of the incoming conditioned frequency modulated carrier signal of the phase detector to produce the control signal input to the phase detector.

6. A wireless communication system in accordance with claim 1, wherein the source for producing audio signals on the ultrasonic transmitting device comprises a microphone.

7. A wireless communication system in accordance with claim 1, wherein the source for producing audio signals on the ultrasonic transmitting device comprises a recording tape deck.

8. A wireless communication system in accordance with claim 1, wherein the converter on the ultrasonic transmitting device for receiving a frequency modulated carrier signal and producing a frequency modulated acoustic pressure wave signal further comprises:

a power amplifier; and an electroacoustic transducer.

9. A wireless communication system in accordance with claim 1, wherein the converter on the ultrasonic receiving device for receiving frequency modulated acoustic pressure wave signals and producing a frequency modulated electronic carrier signal further comprises an electroacoustic transducer.

10. A wireless communication system in accordance with claim 1, further comprising a signal conditioner on the ultrasonic receiving device for producing a conditioned frequency modulated carrier signal that is received by the demodulator, said signal conditioner comprising:

a filter for receiving a frequency modulated electronic carrier signal, filtering unwanted ambient acoustic noise from the carrier medium producing a filtered frequency modulated carrier signal; and a pre-amplifier for receiving the filtered frequency modulated carrier signal and amplifying the filtered frequency modulated carrier signal to produce a conditioned frequency modulated carrier signal.

11. A wireless communication system in accordance with claim 10, wherein the filter for receiving a frequency modulated electronic carrier signal and producing a filtered frequency modulated carrier signal comprises a band-pass filter.

12. A wireless communication system in accordance with claim 10, wherein the filter for receiving a frequency modulated electronic carrier signal and producing a filtered frequency modulated carrier signal comprises a high-pass filter.

13. A wireless communication system in accordance with claim 1, further comprising a filter for receiving the demodulated audio signal to produce a filtered audio signal that is received by the output device, said filter comprising a low-pass filter.

14. A wireless communication system in accordance with claim 1, wherein the output device for receiving the final audio signal comprises an audio speaker.

15. A wireless communication system in accordance with claim 1, wherein the output device for receiving the final audio signal comprises a set of headphones.

16. A wireless two-way ultrasonic communication system comprising two or more matching devices each further comprising both an ultrasonic transmitting device and an ultrasonic receiving device in accordance with claim 1, whereby each device both transmits signals to and receives signals from the matching device.

17. A wireless communication system in accordance with claim 1, wherein the ultrasonic transmitting device further comprises an adjustable tuner for altering the ultrasonic carrier frequency to create a multi-channel transmitting device such that a signal may be transmitted on various channels to reach variously tuned ultrasonic receiving devices.

18. A wireless communication system in accordance with claim 1, wherein the source for producing audio signals on the ultrasonic transmitting device comprises:

a digital-to-analog converter for receiving digital electronic signals and converting the digital electronic signals to analog to produce the audio signal input; and wherein the output device on the ultrasonic receiving device comprises:

an analog-to-digital converter for receiving the final audio signal and converting said final audio signal to digital electronic signals; such that the system may be used as a wireless computer network.

19. A wireless communication system for transmitting and receiving audio signals via ultrasonic acoustical pressure waves comprising an ultrasonic transmitting device and an ultrasonic receiving device;

wherein the ultrasonic transmitting device further comprises:

a source for producing audio signals;

a pre-amplifier for receiving the audio signals and amplifying the audio signals to produce an amplified audio signal;

a frequency modulator for receiving the amplified audio signal, frequency modulating an ultrasonic carrier signal with the amplified audio signal, and producing a frequency modulated carrier signal;

a converter for receiving a frequency modulated carrier signal and transforming the frequency modulated carrier signal to produce a frequency modulated acoustic pressure wave signal; and wherein the ultrasonic receiving device further comprises:

a converter for receiving frequency modulated acoustic pressure wave signals and transforming the frequency modulated acoustic pressure wave signals to produce a frequency modulated electronic carrier signal;

a signal conditioner for receiving a frequency modulated electronic carrier signal, conditioning the frequency modulated electronic carrier signal for frequency demodulation, and producing a conditioned frequency modulated carrier signal;

a phase-locked loop demodulator for receiving a conditioned frequency modulated carrier signal, demodulating the modulating audio signal from the ultrasonic carrier signal, and producing a demodulated audio signal;

a filter for receiving a demodulated audio signal, removing unwanted electronic noise and producing a filtered audio signal;

an audio amplifier for receiving a filtered audio signal and amplifying the filtered audio signal to produce a final audio signal; and an output device for receiving the final audio signal.

20. A wireless communication system in accordance with claim 19 wherein the source for producing audio signals on the ultrasonic transmitting device comprises a microphone.

21. A wireless communication system in accordance with claim 19, wherein the source for producing audio signals on the ultrasonic transmitting device comprises a recording tape deck.

22. A wireless communication system in accordance with claim 19, wherein the converter on the ultrasonic transmitting device for receiving a frequency modulated carrier signal and producing a frequency modulated acoustic pressure wave signal further comprises:

a power amplifier; and an electroacoustic transducer.

23. A wireless communication system in accordance with claim 19, wherein the converter on the ultrasonic receiving device for receiving frequency modulated acoustic pressure wave signals and producing a frequency modulated electronic carrier signal further comprises an electroacoustic transducer.

24. A wireless communication system in accordance with claim 19, wherein the signal conditioner on the ultrasonic receiving device for producing a conditioned frequency modulated carrier signal further comprises:

a filter for receiving a frequency modulated electronic carrier signal, filtering unwanted ambient acoustic noise from the carrier medium producing a filtered frequency modulated carrier signal; and a pre-amplifier for receiving the filtered frequency modulated carrier signal and amplifying the filtered frequency modulated carrier signal to produce a conditioned frequency modulated carrier signal.

25. A wireless communication system in accordance with claim 24, wherein the filter for receiving a frequency modulated electronic carrier signal and producing a filtered frequency modulated carrier signal comprises a band-pass filter.

26. A wireless communication system in accordance with claim 24, wherein the filter for receiving a frequency modulated electronic carrier signal and producing a filtered frequency modulated carrier signal comprises a high-pass filter.

27. A wireless communication system in accordance with claim 19, wherein the filter for receiving the demodulated audio signal to produce the filtered audio signal further comprises a low-pass filter.

28. A wireless communication system in accordance with claim 19, wherein the output device for receiving the final audio signal comprises an audio speaker.

29. A wireless communication system in accordance with claim 19, wherein the output device for receiving the final audio signal comprises a set of headphones.

30. A wireless two-way ultrasonic communication system comprising two or more matching devices each further comprising both an ultrasonic transmitting device and an ultrasonic receiving device in accordance with claim 19, whereby each device both transmits signals to and receives signals from the matching device.

31. A wireless communication system in accordance with claim 19, wherein the ultrasonic transmitting device further comprises an adjustable tuner for altering the ultrasonic carrier frequency to create a multi-channel transmitting device such that a signal may be transmitted on various channels to reach variously tuned ultrasonic receiving devices.

32. A wireless communication system in accordance with claim 19, wherein the source for producing audio signals on the ultrasonic transmitting device comprises:

- a digital-to-analog converter for receiving digital electronic signals and converting the digital electronic signals to analog to produce the audio signal input; and wherein the output device on the ultrasonic receiving device comprises:
- an analog-to-digital converter for receiving the final audio signal and converting said final audio signal to digital electronic signals;

such that the system may be used as a wireless computer network.

* * * * *